July 16, 1940.   R. E. ALEXANDER   2,207,965
FIRE EXTINGUISHER
Filed Nov. 7, 1938
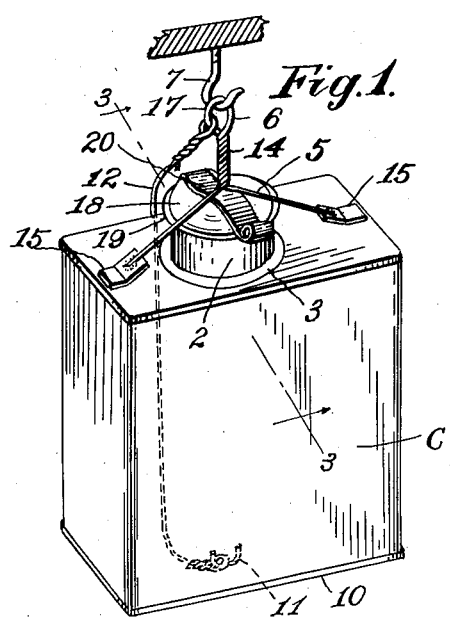
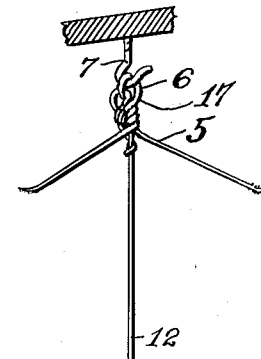
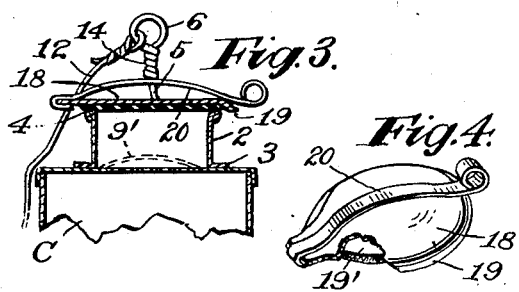
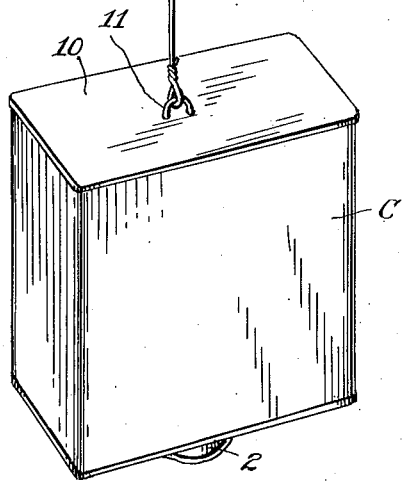
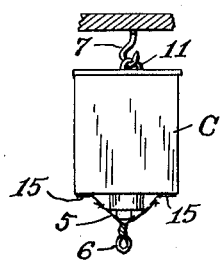
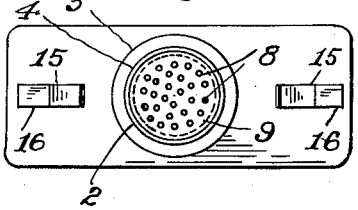
INVENTOR
Richard E. Alexander Patented July 16, 1940

2,207,965

UNITED STATES PATENT OFFICE 2,207,965

FIRE EXTINGUISHER

Richard E. Alexander, New York, N. Y.

Application November 7, 1938, Serial No. 239,246

4 Claims. (Cl. 169—26)

This invention relates to fire extinguishers, and is more particularly of the sprinkler type, adapted to automatically operate under a predetermined temperature, and the device may be manually operated.

The apparatus is designed to provide each extinguisher as a complete self-contained unit, that is to say, not connected with a remote supply under pressure, as is the usual practice, to a multiple of such devices, with complicated release valves, nor the self-feeding individual type, carrying a quantity of liquid, having such complicated valve mechanism.

In the present invention, each unit consists of a container of suitable size, to hold a sufficient supply of suitable extinguisher liquid, which container, or as many as may be desired, is supported on a hook, or other suitable support fixed in the ceiling, or other desired place, to be over, or near the area or such parts to be protected. When the temperature at the fusing point has been reached, the time at which the apparatus is to operate, the top end of the container is released from a member connected to the container, an upstanding part thereof hooked to the carrying support, and by a flexible connection with the bottom of the container, will cause the container to drop and be inverted, during which time the closure is free to fall off its seat, and the contents of the container discharged on the fire or in its vicinity.

The discharge from the container may be effected in any desired manner, such as a splash, through a single suitable opening, or as by sprinkling, through a number of restricted openings, these openings, one or more, are in an area surrounded by the neck. The neck has at its free end a suitable removable closure cap for filling the container. The openings in the top of the container are the same through which the contents are discharged when the container is inverted.

The primary object of the invention is to provide an extremely simple, reliable and efficient working device, that may be produced at a very low cost of production, as compared with other devices of this kind.

Another object is to provide a device of this type, to be entirely automatic, both in its time of operation by fusing of a member, to release the container at the upper end thereof for turning of the container, and by any suitable means, adapted as well for supporting the same in the inverted position, to discharge the contents thereof.

A still further object, is to support the extinguisher in such a manner for quick removal thereof, from the carrying support, as well as the closure that seals the contents of the container, for manual use, which closure when the device is operated automatically will release itself, and the closure is removable manually from the neck, either while the container is suspended in its upright position, or after removal thereof from the support.

Figure 1 is a perspective view of my improved fire extinguisher.

Figure 2 is a similar view of my fire extinguisher in its discharging position.

Figure 3 is a cross-sectional view taken on line 3—3 of Figure 1.

Figure 4 is a perspective view of the closure, broken away in part.

Figure 5 is a plan view of the container with the closure cap removed.

Figure 6 is a view in elevation of my fire extinguisher supported in an inverted position.

Describing the accompanying drawing: In Fig. 1, C is a container constructed of any suitable material with a neck 2 permanently attached, which is closed by a cap 18 loosely fitted, so as to drop off when the container C is inverted in a discharge position. Said cap 18 is provided with a spring 20 and held down on the container by a twisted wire 14 which is attached to two permanent members 15 by a low-fusing solder. The center of said twisted wire forms a loop 6 for suspending the extinguisher from a hook 7 or other device fixed to a ceiling or wall.

A flexible wire, or chain 12 is permanently attached to the bottom of the container C at 11 and fastened to the loop or screw-eye 6 at 17. The cap 18 is provided with a gasket 19' to prevent evaporation and is shown in cut-away drawing in Fig. 4. The spring on cap 18 is provided with a loop on its free end to facilitate quick removal of cap, by pulling it out from under the adjusting twisted wire or screw-eye in case of manual use, and the rim 19 of the cap is flattened on the rear to allow for such removal, as shown in Fig. 4.

Having described my invention, I claim:

1. A fire extinguisher, comprising a container having a perforated portion through which the container is filled and emptied, a tubular neck fixed to the container, surrounding said perforated area, said neck provided with a removable closure cap, means, including a releasable supporting member, attached to fixtures on the top of the container by a low-fusing solder, adapted to support the container in position on a carrying support, which on the release thereof, at a predetermined temperature, will free the upper end of the container, said releasable supporting member of a length to extend over the neck with the closure thereon and comprising means midway of its length to support same on the carrying support and means to regulate the pressure on said closure, a spring fixed to the top of the closure at one end and having at its free end a loop serving as a finger grip for the ready removal thereof of the closure from under said releasable supporting member, means connected with said releasable supporting member and the bottom of the container, effective to invert the container and support it in the discharging position, in which position the closure will fall off and the contents of the container will be discharged.

2. A fire extinguisher for automatic and manual operation, comprising a container having a neck portion, through which the container is filled and discharged, a closure adapted to be seated on the top of the neck, to seal the contents of the container, a spring member fixed to one end of the closure and extending over and forward across the top thereof, the free end of the spring provided with a finger grip for removal of the closure from its seat transversely of the axis of the neck, adjustable means releasably fixed to fittings on each side of the neck, at the top of the container and extending over the closure to engage and hold the closure to the seat, means connected with said releasable means, adapted to support the container on a supporting hook, and for regulation of the pressure on the closure, an open fitting at the bottom of the container adapted to engage the carrying hook for supporting the extinguisher in the inverted position, and a connection from the releasable means to said open fitting at the bottom of the container, for inverting the container, when the same is suspended in an upright position by said releasable means.

3. A fire extinguisher adapted for automatic and manual operation, comprising a container having a neck portion through which the container is filled and discharged, a closure to close the same, a carrying support on which the extinguisher is suspended, a bridge member extending over the neck and the closure, the ends of which, attached by a fusible material to fittings carried by the container, an adjustable open upstanding portion of said bridge member adapted to support the container on the support and hold the closure to its seat on the neck, a spring fixed to the top of the closure, which is engaged by said adjustable upstanding portion of the bridge member to regulate the pressure on the closure.

4. A fire extinguisher adapted for manual and automatic operation, comprising a container having one or more perforations at the top thereof, in an area surrounded by a neck portion, through which the container is filled and discharged, a closure for the top of the neck, having a yielding spring affixed at one end thereof reaching over the top to the front, and a finger-grip on the free end of said spring, adapted for the removal of the closure from the side of the neck, releasable means attached to fittings at each side of the container, said means adapted to bridge over the neck and the closure to hold the same to its seat, said means comprising an upstanding part, provided with a carrying portion for engagement with a supporting hook for suspension of the container, means between the hook and the releasable means to regulate the pressure on the closure, and means connected with said releasable means and the bottom of the container, to invert the container on release of said releasable means at a predetermined temperature, substantially as specified.

RICHARD E. ALEXANDER.